Dec. 13, 1966  S. M. LOKEN  3,291,151

FLUID EXCHANGE SYSTEM

Filed Nov. 6, 1963

INVENTOR
SELMER M. LOKEN
BY Donald M. Sell
ATTORNEY

| United States Patent Office | 3,291,151
Patented Dec. 13, 1966 |

3,291,151
FLUID EXCHANGE SYSTEM
Selmer M. Loken, 795 Arlington Ave. W., St. Paul, Minn.
Filed Nov. 6, 1963, Ser. No. 321,817
1 Claim. (Cl. 137—565)

This invention relates to a fluid exchange system such as those used in blood replacement procedures and the like. More particularly this invention relates to a new and useful fluid exchange system adapted to facilitate the replacement of blood in the body with fresh blood with a considerable reduction in some of the hazards now attendant thereto.

While the system I have invented is suitable for any fluid, particularly liquid, exchange procedure where one fluid is to be exchanged for another with minimum disturbance of the fluid volume in the fluid reservoir in which the exchange is to take place, the system is particularly applicable to blood replacement procedures such as those normally carried out as, for example, on so called "Rh factor" infants. With such infants it is customary, when the infant's blood is Rh positive and the mother's blood is Rh negative and contains Rh antibodies, to completely replace the infant's blood with fresh blood free from Rh antibodies.

Present procedures for replacing blood involve systems which require technicians to manually operate valves to supply new blood and withdraw old blood and further require the physical counting of each volume of blood withdrawn and a correlation of this count with each replacement volume of blood added. When it is considered that the amount of blood to be replaced in the human body may be as much as 500 cubic centimeters and the repalcement is to be carried out in about 10 cubic centimeter increments, it is apparent that the chance for error, that is simple mechanical error in manipulating the system, becomes fairly high. Each increment exchange requires separate valve and counting manipulations, and with 50 repetitions of procedure required to complete the exchange, the chances for error are disturbingly high.

I have invented a fluid exchange system which does much to minimize chances of error in carrying out blood replacement procedures. In accordance with my invention a fluid exchange system is provided which requires no manual valve manipulation and wherein the amount of replacement fluid added is directly controlled by the amount of fluid withdrawn. With this new fluid exchange system, a procedure for exchanging fluid is provided wherein human error is greatly minimized, the withdrawal of old fluid and the replacement thereof by fresh fluid being controlled by the operating characteristics of the system itself. Further, the system is simple to assemble, operate and service and requires very few and readily inspectable parts which are commonly available in its operation.

Although my new fluid exchange system can take many forms, in general it is a closed system in the sense that the internal pressure of the system is, during the use of the system, sealed from the atmosphere surrounding it, as well as against the passage of liquids or other fluids into and from the internal passages of the system other than at the fluid exchange terminal. The system is pressure responsive in that it withdraws fluid from the fluid reservoir and dispenses new fluid to the fluid reservoir in accordance with variations of pressure within the system; and, it is self-adjusting in the sense that the amount of fluid dispensed from the system is a function of the amount of fluid collected by the system from the fluid reservoir.

The system comprises a fixed volume fluid supply or dispensing vessel having therewithin a variable volume fluid collecting vessel. The vessel has fluid conducting means leading therefrom for connection to a fluid exchange point at which old fluid from a fluid reservoir is to be exchanged for new fluid. A syringe, or other pressure varying means, initially reduces the pressure in the system and causes old fluid to be drawn into the system from the fluid reservoir. Upon return to its initial position, the syringe or other pressure varying means, forces the old fluid drawn into the system into the fluid collecting vessel. The fluid collecting vessel, being expansible, expands and causes the new replacement fluid in the fluid supply vessel to be displaced by the amount of the increased volume of the collecting vessel. This displacement of course creates increased pressure on the fluid in the fluid supply vessel causing the same to open a pressure responsive valve in the fluid dispensing or supply tube causing an amount of fluid to be dispensed from the supply vessel equal to that added to the collecting vessel. Thereupon the system again achieves equilibrium and is ready for another cycle. By use of a measuring syringe as the pressure varying means as large or as small an amount of fluid can be replaced for each cycle as is desired with no equipment adjustment required. Thus, if it is desired to withdraw and replace one cc. of fluid at a time this can be done and if it is desired to withdraw and replace 10 ccs. of fluid at a time this can be done within, of course, the limit of capacity of the syringe.

The invention will be further described with reference to a specific embodiment illustrated in the accompanying drawings wherein.

Referring now to the accompanying drawings in detail there is disclosed therein a fluid exchange system made in accordance with my invention suitable for use, for example, in replacing the blood of a newborn infant having Rh factor blood difficulty.

Figure 1:
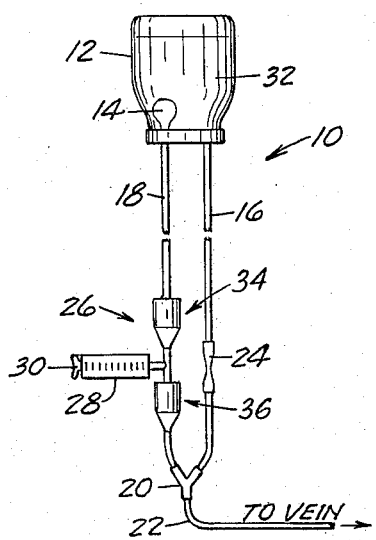
FIGURE 1 is a side elevational view of an operative embodiment of the system prior to use.

Referring first to FIGURE 1 of the drawing, there is disclosed therein the fluid exchange system in its entirety as designated by the numeral 10. The system comprises essentially a fixed volume fluid dispensing or supply vessel 12 having therewithin a variable volume fluid collecting vessel 14, which latter vessel may be in the form of an expansible rubbery balloon or the like.

Leading from the dispensing vessel 12 is a suitable fluid supply conducting means in the form of a tube 16 and leading from the collecting vessel 14 is a fluid conducting means in the form of a fluid collecting tube 18. By means of a coupling or the like 20 the tubes 18 and 16 merge into a fluid exchange tube 22 which opens (by means not shown) into the vein of an infant whose blood is to be replaced. As illustrated in this figure, interposed intermediate the ends of the fluid supply tube 16 is a normally closed pressure responsive fluid dispensing controlling valve means 24.

Disposed intermediate the ends of the fluid collecting tube 18 is a pressure responsive fluid exchange controlling valve means 26 which is further operatively connected with a pressure varying means in the form of a syringe or the like 28.

In this figure the plunger 30 of the syringe 28 is in its depressed position, the collecting vessel 14 is empty, or possibly contains a small amount of saline solution used to prime the system and get the air out of it as a precautionary procedure before use, and the replacement fluid 32 in the desired amount is in the outer dispensing vessel 12.

Figure 2:
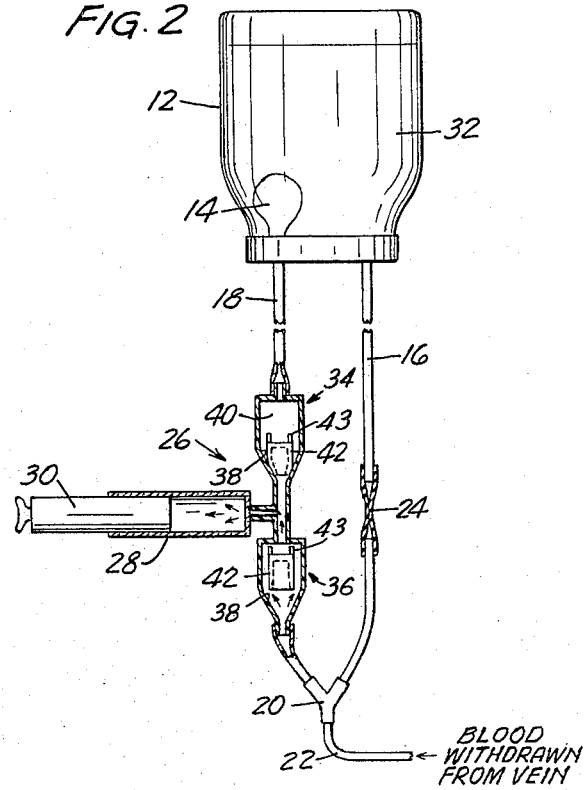
FIGURE 2 is a side elevational view similar to FIGURE 1, with certain parts being on an enlarged scale and broken away to show operating details, of the system and the manner in which it is operated to withdraw fluid.

Turning now to FIGURE 2 the operation of the system will become apparent. For convenience of description the fluid exchange controlling valve means 26 has parts thereof broken away for clarity of noting internal detail. This valve means comprises a pair of one-way check valves 34 and 36 between which the syringe 28 is interposed. The check valves 34 and 36 are disposed in series and may be substantially identical, as shown, or different if desired. Whether the same or different the check valves are so disposed with respect to the syringe 28 that upon withdrawal of the syringe plunger 30 the upper check valve 34 is closed and the lower check valve 36 is opened.

Each of the valve constructions of 34 and 36 in the embodiment shown comprises a valve housing forming a tapered valve seat 38 therewithin and having a valve chamber 40 thereabove within which rides a check valve 42. To achieve adequate sealing without special regard for machining of parts and the like, each of the check valves 42 comprises essentially a short section of hollow rubbery tube having the upper end thereof closed and the lower end thereof open so that as the valve 42 falls into place against the valve seat 38 it provides a compressible elastic tip which readily conforms to the seat and seals, enabling the use of simple molded plastic parts of polyethylene and the like in the valve construction. The tubular shape of the valve bodies 42 is depicted by the dotted line illustration of these valve bodies in FIGURES 2 and 3 of the drawings. Stops, such as projections 43 molded into the tops of check valves 42, can be used to prevent blocking passage through the valves when the valves are open.

As illustrated in FIGURE 2, as the plunger 30 is retracted, blood is withdrawn from the vein and flows upwardly through collecting tube 18 through valve 36 into the reservoir of the syringe 28. During this operation the upper check valve 34 leading from the syringe to the collecting vessel 14 remains closed as does the fluid dispensing valve 24 on the tube 16 leading from the fluid dispensing vessel 12. As will be apparent from this, the amount of blood withdrawn from the vein during this pressure reducing cycle is readily measured either by the capacity of the syringe in the event it is used to full capacity or to the measured amount of blood indicated on the syringe scale in accordance with the amount of retraction of the plunger 30. The blood flow from the vein is indicated by the arrows.

Figure 3:
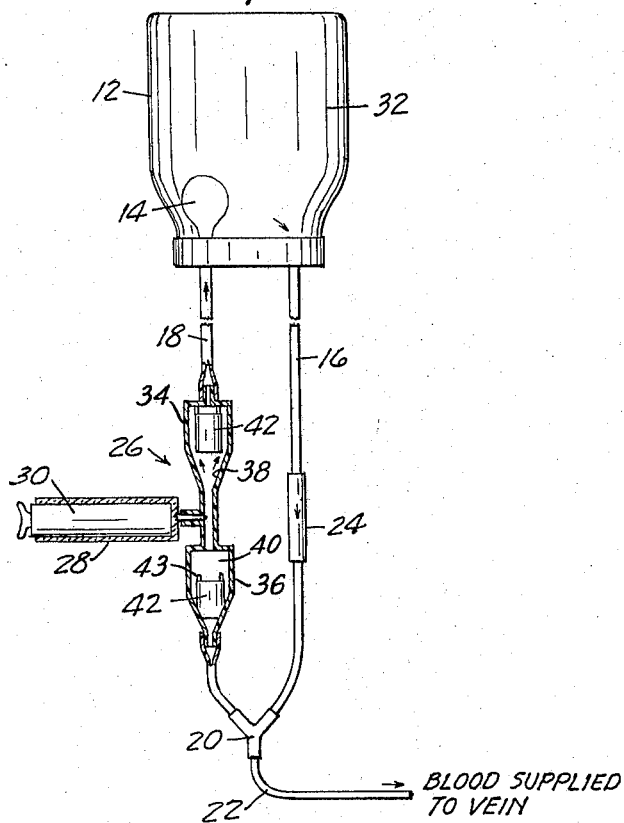
FIGURE 3 is a view similar to FIGURE 2 disclosing a second phase of the operation of the system wherein fluid is being dispensed from the system rather than being drawn thereinto.

Now turning to FIGURE 3, it is seen that upon depressing the plunger 30 to its original position, the blood is expelled therefrom, unseating the valve body 42 from the upper valve 34 and forcing the blood displaced from the syringe 28 into the expansible collecting vessel 14 thereby expanding this bag by a volume equal to the volume of blood withdrawn from the vein in the first instance. Also, the pressure exerted by the blood leaving the syringe body 28 closes the lower valve 36.

The expansion of the fluid collecting bag 14 within the fixed volume outer container 12 increases the pressure on the replacement blood 32 causing it to move downward through the tube 16 in the direction of the arrow with greater force than before thereby forcing open the valve 24 interposed between the ends of the tube 16 and causing the new blood to flow therethrough to the blood exchange tube 22 and thence to the vein to replace the blood previously withdrawn. Obviously, when the amount of replacement fluid 32 equals or approximately equals the amount of collected blood in the reservoir 14 the system will be again at equilibrium and valve 24 closes again.

Figure 4:
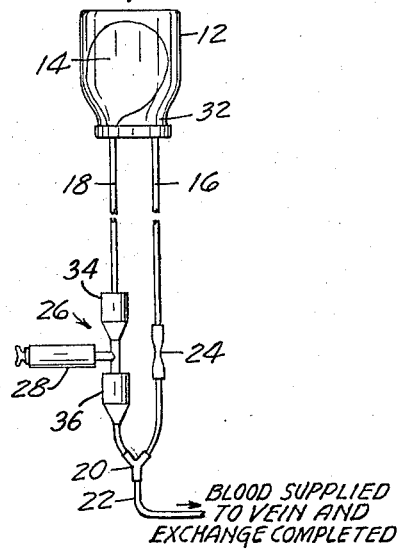
FIGURE 4 is a view similar to FIGURE 1 disclosing the system again at rest with all of the fluid dispensed therefrom and displaced with the fluid collected.

Upon repeating the procedures of FIGURES 2 and 3 eventually the situation is reached as shown in FIGURE 4 wherein the expansible bag 14 has completely displaced the volume of replacement fluid in the dispensing vessel 12 and the exchange is complete with an amount of fresh blood having been added to the vein of the infant approximately equal to the amount of blood withdrawn from the vein of the infant.

The valve 24 may be simply a piece of highly elastic tubing as shown which normally collapses or constricts into a sealing position. However, it, like the other elements of the system may be more or less sophisticated in accordance with the use to which the system is to be put, engineering design, and as available parts dictate.

It will be apparent to those skilled in the art that the invention is capable of practice with a large variety of specific embodiments without departing from the essential operating characteristics thereof. Consequently, it is to be understood that the ambit of the invention is to be limited only as required by the appended claims.

I claim:

A pressure responsive, self-adjusting fluid exchange system comprising a fluid dispensing vessel of fixed volume having therewithin an expansible fluid collecting vessel, a fluid collecting tube leading from said collecting vessel and a fluid dispensing tube leading from said dispensing vessel, said tubes terminating at a fluid exchange point, normally closed fluid dispensing controlling pressure responsive valve means interrupting said dispensing tube, a pair of pressure responsive fluid exchange controlling valves interrupting said collecting tube, and pressure varying means operatively interconnecting said exchange controlling valves for opening the fluid exchange controlling valve between said pressure varying means and said exchange point upon decrease of pressure therewithin, and for opening the other of said exchange controlling valves and said dispensing controlling valve upon return of the original pressure thereto.

References Cited by the Examiner

UNITED STATES PATENTS

| | | | |
|---|---|---|---|
| 1,282,000 | 10/1918 | Quayle | 128—234 |
| 2,074,223 | 3/1937 | Horiuchi | 128—214 |
| 3,072,296 | 1/1963 | Isreeli | 222—386.5 |
| 3,166,096 | 1/1965 | Lang | 137—564.5 |

M. CARY NELSON, *Primary Examiner.*

W. CLINE, *Assistant Examiner.*